(No Model.)
H. W. ALSHOUSE.
HARROW.
No. 364,203. Patented June 7, 1887.
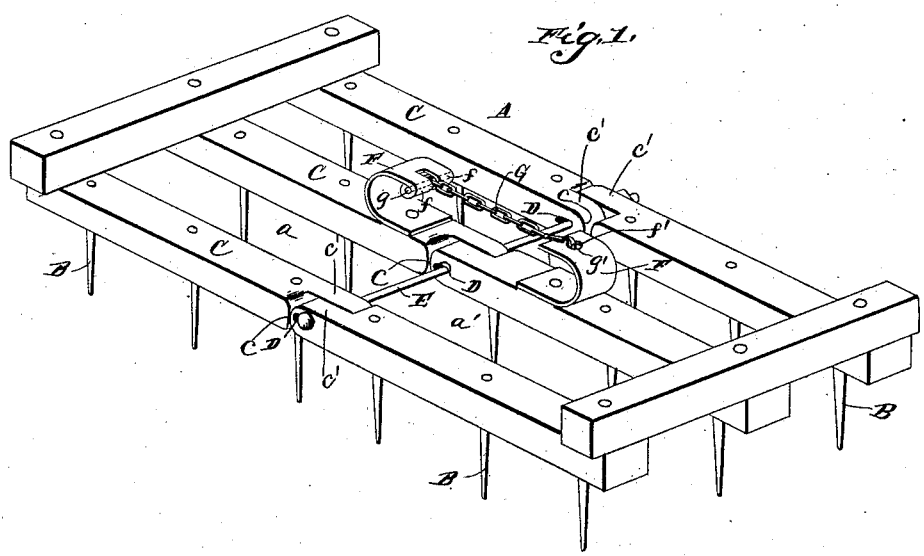
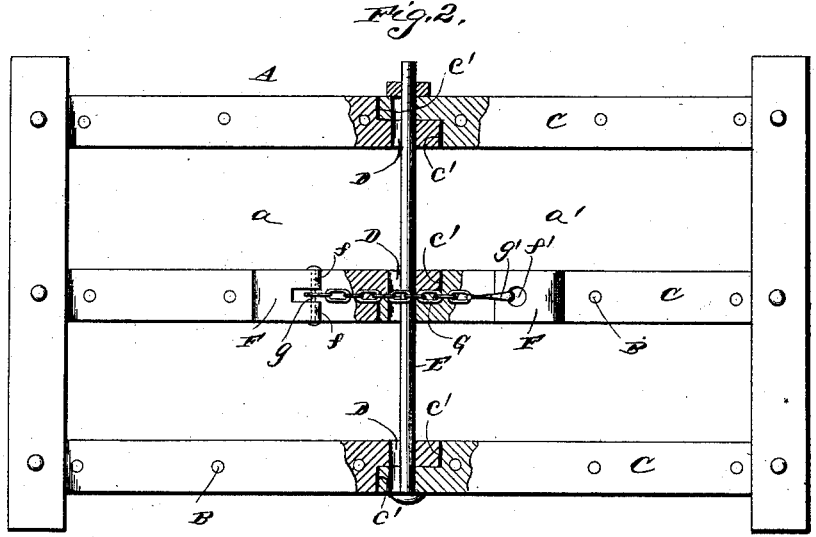
Witnesses
C. D. Taylor
E. G. Siggers
Inventor
H. W. Alshouse
By his Attorneys,
C. A. Snow & Co.

UNITED STATES PATENT OFFICE.

HENRY WALDO ALSHOUSE, OF CUSTER, INDIANA.

HARROW.

SPECIFICATION forming part of Letters Patent No. 364,203, dated June 7, 1887.

Application filed March 12, 1887. Serial No. 230,696. (No model.)

*To all whom it may concern:*

Be it known that I, HENRY WALDO ALSHOUSE, a citizen of the United States, residing at Custer, in the county of De Kalb and State of Indiana, have invented a new and useful Improvement in Harrows, of which the following is a specification.

My invention, which is an improvement on a patent granted to me on the 28th day of December, 1886, and numbered 354,963, relates to harrows made with hinged sections, its object being to allow the sections of the harrow perfect freedom of motion upon each other, and when riding over some obstruction on the ground to cause the harrow-teeth to penetrate equal distances in the soil, and to prevent the rear section from dragging upon the front section and give it an easy spring-controlling motion thereon.

The invention consists in the construction and arrangement of the springs secured to the harrow-section, and of the parts connecting said springs, and the combination thereof with the hinged sections, as hereinafter described, illustrated in the drawings, and pointed out in the claims appended.

In the accompanying drawings, Figure 1 represents a perspective view of my improved harrow. Fig. 2 is a top plan view of the same, partly in section.

Referring to the drawings by letter, A designates the harrow-frame, composed of the similar sections $a$ $a'$, and having secured to it at proper points the teeth B B, which may be of any usual construction, but are preferably spring-teeth.

The longitudinal rails C of the sections have their meeting ends $c$ rounded from above downward, and are cut away laterally to form the shoulders $c'$, which are similarly rounded, so that the ends of the rails of one section can turn easily on the shoulders of the rails of the other section.

D D are similar transverse longitudinally-extended openings in the rails C C, near their ends; and E is a cylindrical rod passing through said openings, so as to connect the two sections, and yet allow them to move slightly in a longitudinal direction on each other. The said rod E is headed at one end and threaded at the other to engage a nut which retains it in place.

F F are similar springs of strong plate-steel, secured at their lower ends, by bolts or otherwise, to the rails C C of each section at equal distances from the ends thereof, and with their convex surfaces toward the outer ends of the sections. The upper end of one of said springs is rolled over in tubular form and notched through the tube centrally to form bearings $f$ $f$, and the upper end of the other spring is provided with an opening, $f'$.

G represents a chain, which is provided at one end with a hook, $g'$, adapted to engage the opening $f'$.

$g$ represents a rod, which is adapted to be inserted through any link of the chain and through the bearings $f$, and thereby connect the upper free ends of the springs together, and thus secure the hinged sections of the harrow so firmly together that the harrow-teeth near the hinged sides of the harrow-sections will be kept at work and in engagement with the ground.

The tension of the chain on the springs causes the latter to force the central hinged portion of the harrow downward, and thus serves to overcome the objectionable tendency of ordinary hinged sectional harrows to bow or ride upward at the center, and thereby cause the central harrow-teeth to work too shallow in the ground.

By shortening the chain the downward pressure exerted by the springs on the harrow-sections may be increased to such an extent as to cause the central harrow-teeth to work at any desired depth in the ground.

While the springs and chain serve to normally keep the central teeth at work, the springs will of course yield to violent pressure, caused when a stump or other obstruction is encountered, and consequently will permit the central hinged portion of the harrow under such conditions to rise and clear the harrow-teeth of the obstruction.

The longitudinal openings D permit the rod E and the rear section to move longitudinally a slight distance independent of the front section. This causes an obstruction encountered by the rear section to permit the latter to yield with the springs, and thus relieves the machine and the team of violent wrenching jerks. After the obstruction is cleared the springs and chain draw the rear section to its former position.

Having described my invention, I claim—

1. In a harrow, the combination of the sections hinged together, the springs secured to the longitudinal rails of the sections at their lower ends and having their convex surfaces toward the outer ends of the sections, and the chains connecting the upper ends of said springs, substantially as specified.

2. In a harrow, the combination, with the sections hinged together, substantially as described, of the springs F F, secured to the longitudinal rails of the sections with their convex surfaces outward, and respectively provided with the bearings $ff$ and openings $f'$, the rod $g$, with its transverse arms journaled in the bearings $f$, the chain secured to the said rod, and the hook secured to the other end of the chain and engaging in the opening $f'$, substantially as specified.

3. In a harrow, the combination, with the springs F, secured to the sections of the harrow, and a chain connecting the upper ends of said springs, substantially as described, of the two harrow-sections $a$ $a'$, each provided with longitudinal rails C, longitudinally-extended openings D, and the hinge-rod E, passing through said openings, so as to loosely connect the sections, substantially as described, for the purpose set forth.

4. In a harrow, the sections hinged together, the springs F, attached to each section on opposite sides of the hinge-point, and the chain connecting the springs and spanning the hinge-point, said chain being adapted to be lengthened and shortened, substantially as described.

In testimony that I claim the foregoing as my own I have hereto affixed my signature in presence of two witnesses.

HENRY WALDO ALSHOUSE.

Witnesses:
ALONZO STRONG,
ANDREW ALSHOUSE.